United States Patent Office 2,889,248
Patented June 2, 1959

2,889,248

THERAPEUTIC COMPOSITION CONTAINING ALUMINUM PROTEINATE

Laurene O. Paterson, Adrian, Mich., assignor to Drug Processors, Inc., Adrian, Mich., a corporation of Michigan No Drawing. Application December 13, 1955
Serial No. 552,705

5 Claims. (Cl. 167—55)

This invention relates to improved therapeutic compositions and, more particularly, to compositions having increased stability and enhanced therapeutic acceptance.

It is well known that certain drugs or therapeutic agents are susceptible to deterioration in the presence of moisture. When such materials are compounded in the form of powder or tablets and stored prior to use, care must be taken to exclude moisture therefrom in order to prevent hydrolytic decomposition. A sack of silica gel may be packaged with medicinal agents which are particularly sensitive to moisture to act as a desiccant in the container. Since this drying agent cannot be ingested, its admixture with drugs during compounding to act as an internal desiccant is not possible. Furthermore, when certain drugs are taken in tablet form, they have a tendency to induce undesirable acid conditions in the stomach. Compounds that have been proposed for use with drugs to combat the undesired acid condition have not been entirely satisfactory, since they may promote breakdown of the active components.

Accordingly, it is an object of the present invention to provide means for stabilizing medicinal agents which are themselves subject to hydrolytic decomposition.

It is another object of this invention to provide, with therapeutic compositions containing a drug or agent having inherently acidic and irritating properties, a compound which counteracts such properties.

It is another object of the invention to provide a substance for the removal of free hydrochloric acid in admixture with therapeutic agents which may promote gastric hyperacidity.

It is a further object of this invention to provide in combination with anticholinergic agents a substance which will function to give rapid relief by taking up free hydrochloric acid already present in the stomach.

It is a further object of the invention to provide in combination with an antihistaminic agent a substance which functions to relieve gastric hyperacidity possibly resulting from the high istamine levels of the blood as associated with allergic conditions.

Further and additional objects will appear from the following description and the accompanying claims.

In accordance with this invention, a therapeutic composition has been provided which has added thereto an aluminum proteinate and the invention is particularly useful in the preparation of tableted products, such as the salicylates, the antihistamines and the anticholinergics. The aluminum proteinate in such tableted compositions is added in dry form to the compounded mixture just before tableting. It serves the dual purpose of an internal desiccant to remove residual moisture and to act as a buffering agent to prevent or relieve conditions of hyperacidity when the tablet is taken by the patient. Aluminum proteinates particularly suitable for the purposes of this invention may be prepared as described in my copending patent applications Serial No. 249,817, filed October 1, 1951, now U.S. Patent No. 2,721,861, and Serial No. 412,085, filed February 23, 1954. Such aluminum proteinates are, generally speaking, unique complexes of a semi-hydrate of aluminum with the protein. In the dry state they are free-flowing powders having excellent dehydrating and acid-combining properties.

Aluminum proteinates, upon drying, assume a solid gel structure, apparently containing randomly intertwined strands of cross-linked protein molecules. It has been found that these materials act much in the manner of silica gel in their ability to adsorb and retain moisture. To demonstrate the moisture adsorption properties of aluminum proteinate, an aluminum milk proteinate was exposed to varying relative humidities in constant humidity chambers. The following Table I compares aluminum milk proteinate with other pharmaceutical components as moisture adsorbents under various humidity conditions. Silica gel is also included for the purposes of comparison, since it is common practice to use this material in a separate package to remove moisture from enclosed areas.

TABLE I

| Substance | Temperature, °F. | Percent Relative Humidity | Water Adsorbed, Percent of Substance Used |
|---|---|---|---|
| Aluminum Milk Proteinate | 80 | 30 | 6.0 |
| | | 50 | 9.5 |
| | | 70 | 23.5 |
| | | 90 | 29.0 |
| Aluminum Glycinate | 80 | 30 | 2.3 |
| | | 50 | 3.6 |
| | | 70 | 4.8 |
| | | 90 | 6.3 |
| Aluminum Hydroxide | 80 | 30 | 1.5 |
| | | 50 | 2.5 |
| | | 70 | 3.0 |
| | | 90 | 4.0 |
| Magnesium Trisilicate | 80 | 30 | 4.0 |
| | | 50 | 8.0 |
| | | 70 | 12.0 |
| | | 90 | 17.0 |
| Starch | 80 | 30 | 4.0 |
| | | 50 | 7.0 |
| | | 70 | 10.0 |
| | | 90 | 13.0 |
| Silica Gel | 80 | 30 | 17.0 |
| | | 50 | 25.0 |
| | | 70 | 30.0 |
| | | 90 | 33.0 |

It will be apparent that, of the various antacids listed in Table I, aluminum milk proteinate and magnesium trisilicate show superior properties as moisture adsorbents. Magnesium trisilicate, however, is so inherently alkaline that it may promote decomposition of certain drugs, and for this reason is not usually recommended as an internal desiccant for medicinal mixtures.

Thus, in accordance with this invention, it has been found that the addition of a dried aluminum proteinate to a powdered or granulated therapeutic mixture serves to adsorb residual moisture and halt deterioration. So effective is aluminum proteinate in contact with medicinal agents containing free or bound water that hydrolytic decomposition of these drugs during storage becomes negligible. Inasmuch as the protein in the aluminum proteinate is edible, such aluminum proteinates have the advantage over silica gel in that the proteinate is pharmaceutically acceptable as a component of oral medicaments. Being a buffering agent, aluminum proteinate also acts to remove simultaneously with the water any free basic or acidic ions.

Aluminum proteinate has the further advantage in combination with drugs of being rapidly solubilized in the gastric juice to release the active components. Since aluminum proteinate functions to bind free acid, it tends to counteract irritation caused by inherently acidic or basic drugs. It also functions to combat gastric hyperacidity and is a desirable adjunct with drugs promoting this condition. When administered in combination with other drugs which reduce gastric acidity by means other than the absorption of hydrochloric acid, the aluminum proteinate promotes rapid relief by taking up any free acid already present in the stomach. In conjunction with other groups of medicaments used primarily to treat conditions other than hyperacidity but which condition may have an accompanying incidental hyperacidity, aluminum proteinate functions to counteract gastric distress.

Salicylic acid and salicylic acid derivatives are widely used as analgesics and antipyretics. These drugs are prescribed routinely for inflammatory processes associated with rheumatic, rheumatoid and arthritic syndromes. Acetyl salicylic acid has particular merit as a pain killer, due to its low toxicity and nonnarcotic nature.

Salicylic acid, usually prescribed in the form of its sodium salt, is fairly stable if protected from the action of light. However, when ingested into the acid environment of the stomach, it may become a serious mucosal irritant. It is common practice to provide an enteric coating for this drug so that release of the active component takes place in the more alkaline intestines. Attempts to apply enteric coating consistently solubilized in the intestinal area have been notoriously unsuccessful. In accordance with this invention combinations of aluminum proteinate with salicylic acid or its sodium salt serve to reduce gastric acidity and permit the rapid absorption of the salicylic acid from the gastric area without nausea.

Acetyl salicylic acid is subject to hydrolytic decomposition in the presence of moisture. The acetic and salicylic acid ions so formed catalyze further decomposition. Acetyl salicylic acid is commonly prescribed in combination with other drugs such as acetophenetidine, acetanilide, antipyrene, etc. Unless special precautions are taken to exclude moisture during compounding of these mixtures, the rate of hydrolysis may become very rapid. It has now been found in accordance with this invention that an aluminum proteinate may be intimately admixed with acetyl salicylic acid alone or in combination with other drugs to provide an environment which effectively prevents hydrolytic fission during compounding, tableting and storage of this medicinal agent. Acetyl salicylic acid may also give rise to gastric distress due to its inherently acid nature and the presence of the aluminum proteinate also buffers to counteract such irritation.

Stability studies on acetyl salicylic acid in combination with aluminum proteinate were conducted at 45° C. for a period of one year. At this temperature, control samples of acetyl salicylic acid showed considerable hydrolysis as indicated by the release of free acetic and salicylic acids at the end of two months. It will be noted from Table II that the inclusion of 10–15% aluminum proteinate in a dry mixture or in tablets effectively prevents hydrolysis. For comparative purposes, tablets containing equivalent amounts of other antacid materials were studied under similar conditions.

TABLE II

*Stability of acetyl salicylic acid in combination with various antacids*

| Antacid Used | Percent Antacid Used | Time | Odor Acetic Acid Detectable | Percent Free Salicylic Acid |
|---|---|---|---|---|
| Aluminum Proteinate | 10 | 2 months | No | 0.09 |
|  | 15 | 2 months | No | 0.08 |
|  | 10 | 1 year | No | 0.1 |
|  | 15 | 1 year | No | 0.12 |
| Aluminum Hydroxide Dried U.S.P. | 15 | 6 months | No | 2.6 |
| Aluminum Glycinate | 15 | 6 months | No | 4.5 |
| Magnesium Trisilicate | 15 | 6 months | No | 6.4 |
| Calcium Carbonate | 10 | 6 months | No | 56.8 |
| No Antacid |  | 2 months | Yes | 5.4 |

Temperature: 45° C.
Analysis conducted by U.S.P. test for free salicylic acid in acetyl salicylic acid.
Control material assayed at time samples prepared showed 0.08% free salicylic acid.

Of the antacid materials listed, aluminum milk proteinate offered maximum protection against hydrolytic decomposition. It might be expected that aluminum hydroxide and aluminum glycinate would offer better protection against hydrolysis due to inactivation of free acetic acid but apparently moisture levels were not held sufficiently low to afford protection. Magnesium trisilicate and calcium carbonate are sufficiently basic to catalyze the breakdown of acetyl salicylic acid.

For a more complete understanding of this invention reference will now be made to several specific examples of compositions prepared in accordance therewith; however, it will be appreciated that the invention is not to be limited to the details of the examples given.

EXAMPLE 1

| | Pounds |
|---|---|
| Acetyl salicylic acid (40 mesh) | 5 |
| Aluminum milk proteinate | 0.75 |
| Sterotex | 0.05 |

These materials were dry mixed and directly compressed into 5.8 gr. tablets.

EXAMPLE 2

| | | |
|---|---|---|
| Acetyl salicylic acid (40 mesh) | lbs | 35 |
| Phenacetin | lbs | 25 |
| Caffeine | lbs | 5 |
| Aluminum caseinate | lbs | 4 |
| Sterotex | oz | 6 |

The phenacetin and caffeine were mixed and granulated using isopropyl alcohol. After drying, this granulation was mixed well with the acetyl salicylic acid and the aluminum caseinate. After the addition of the lubricant Sterotex, tablets were directly compressed.

EXAMPLE 3

| | | |
|---|---|---|
| Sodium salicylate | lbs | 10 |
| Aluminum soya proteinate | lbs | 1.5 |
| Sterotex | oz | 2 |

The sodium salicylate and aluminum soya proteinate were intimately mixed, the Sterotex added and 6.5 gr. tablets directly compressed.

EXAMPLE 4

| | Pounds |
|---|---|
| Sodium chloride | 10 |
| Aluminum milk proteinate | 2 |

These two components were dry mixed and compressed into 12 gr. tablets. Aluminum proteinate assists in counteracting gastric hyperexcretion of hydrochloric acid due to high concentrations of salt.

EXAMPLE 5

| | | |
|---|---|---|
| Methantheline bromide (β-diethylaminoethyl-9-xanthene carboxylate methobromide) | gm | 250 |
| Aluminum milk proteinate | lbs | 5 |
| Sterotex | oz | 1 |

The above components were dry mixed and directly compressed to provide tablets containing 50 milligrams of the anticholinergic agent and 7 gr. of aluminum milk proteinate. The inclusion of the aluminum proteinate combats prevailing gastric hyperacidity.

EXAMPLE 6

| | | |
|---|---|---|
| Benadryl hydrochloride (2-(benzhydryloxy)-N,N-dimethylamine hydrochloride) | gm | 125 |
| Aluminum milk proteinate | lbs | 5 |
| Sterotex | oz | 1 |

The above components were dry mixed and tableted to provide 25 milligrams of the antihistaminic agent and 7 gr. of aluminum milk proteinate. The aluminum proteinate serves to allay gastric hyperacidity which is often associated with allergic conditions due to the high histamine levels of the blood.

In the foregoing examples, the Sterotex, a stearic acid compound, serves as a mold lubricant in the tableting operation, as is well known.

It as been difficult to assign an exact chemical structure to aluminum proteinate. Some water of hydration is retained in the dried product, but this amount is substantially lower than that found in dried aluminum hydroxide gels. Typical analyses on aluminum proteinates prepared from protein of different origin show about 44–46% protein and about 20–22% aluminum calculated as aluminum oxide. Variations in such analyses result from the use of different proteins and varying percentages of bound water. Aluminum proteinates satisfactory for the purposes of this invention may be prepared using skim milk, casein, soya protein, gelatin, blood protein or other edible protein material which may be dissolved or colloidally dispersed. It can be realized that aluminum hydroxide gel may be admixed with aluminum proteinate before or after drying to impart higher acid combining properties to the resultant product. It has been found that aluminum proteinate which has been exposed to high humidities may be regenerated by heating at 80° C. for one hour. Such regenerated aluminum proteinate does not lose its ability to adsorb moisture nor its complete solubility in 0.1 N hydrochloric acid.

In the foregoing examples are indicated a few specific drugs or therapeutic compositions with which the aluminum proteinate may be incorporated in accordance with the teachings of this invention. However, it will be apparent that others may also be used and the specific proportions of the ingredients may vary widely. The amount of aluminum proteinate used will depend upon many factors including the desiccating capacity and buffering capacity desired in the final product. Usually the amount of aluminum proteinate will constitute at least 5 percent by weight of the composition and preferably at least 10 percent by weight. The tablets prepared in accordance with these examples were exceedingly stable upon storage because of the internal desiccating properties of the aluminum proteinate and when ingested the aluminum proteinate acted as a buffer for the purposes above set forth.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A composition comprising an aluminum proteinate wherein the protein of said proteinate is selected from the group consisting of milk protein, casein, soya protein, gelatin and blood protein and a therapeutic agent selected from the group consisting of salicylic acid, sodium salicylate, acetyl salicylic acid, β-diethylaminoethyl-9-xanthene carboxylate methobromide and 2-(benzhydryloxy)-N,N-dimethylamine hydrochloride.

2. The composition recited in claim 1 wherein said protein is a milk protein.

3. The composition recited in claim 1 wherein said therapeutic agent is acetyl salicylic acid.

4. A composition comprising an aluminum milk proteinate and acetyl salicylic acid.

5. A composition of matter in the form of a compressed tablet which comprises acetyl salicylic acid and at least about 5 percent by weight of an aluminum milk proteinate.

References Cited in the file of this patent

UNITED STATES PATENTS 2,721,861    Paterson _____ Oct. 25, 1955

OTHER REFERENCES

Paul: J. Am. Pharm. Assn., June 1950, pp. 21–24.